(12) United States Patent
Burnett

(10) Patent No.: US 8,534,429 B2
(45) Date of Patent: Sep. 17, 2013

(54) PIEZO-ACTUATED BRAKING SYSTEM AND METHOD FOR A STEPPER MOTOR

(75) Inventor: Daniel H. Burnett, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 79 days.

(21) Appl. No.: 13/223,252

(22) Filed: Aug. 31, 2011

(65) Prior Publication Data

US 2013/0048442 A1    Feb. 28, 2013

(51) Int. Cl.
*F16D 55/08* (2006.01)

(52) U.S. Cl.
USPC .......................................... 188/72.1; 188/156

(58) Field of Classification Search
USPC .................................................. 188/156–164
See application file for complete search history.

(56) References Cited

U.S. PATENT DOCUMENTS

| | | | | |
|---|---|---|---|---|
| 5,645,143 A | * | 7/1997 | Mohr et al. | 188/72.1 |
| 5,826,683 A | * | 10/1998 | Murata et al. | 188/161 |
| 6,412,608 B1 | * | 7/2002 | Mohr et al. | 188/72.9 |
| 6,812,663 B2 | * | 11/2004 | Kramer et al. | 318/368 |
| 6,836,035 B1 | * | 12/2004 | Pawletko | 310/49.08 |
| 2008/0283347 A1 | * | 11/2008 | Cao et al. | 188/161 |
| 2011/0260455 A1 | * | 10/2011 | Haar | 290/44 |

* cited by examiner

*Primary Examiner* — Christopher Schwartz
(74) *Attorney, Agent, or Firm* — Joseph E. Root

(57) ABSTRACT

A piezo-actuated braking system for a stepper motor. The braking system has a disk fixed to the output shaft of the stepper motor. Further, the braking system includes a piezo-actuated brake having a clamping structure, including two brake elements positioned in alignment on either side of the disk. The piezo-actuated brake includes a piezoelectric element connected to the clamping structure to move the brake elements together, thus applying a braking force to the disk. Various embodiments of the braking system along with related methods are also described.

23 Claims, 3 Drawing Sheets

PIEZO-ACTUATED BRAKING SYSTEM AND METHOD FOR A STEPPER MOTOR

TECHNICAL FIELD

The presently disclosed embodiments generally relate to stepper motor systems and more particularly, the disclosure relates to methods and systems for applying a brake to stepper motors.

BACKGROUND

Conventionally, every time a stepper motor is stopped, power must be applied to maintain a stationary or holding position. Occasionally, this power may be applied for long periods of time. This power is typically called hold current.

Further, most stepper motor applications have a function that brings the motor to a known "home" position. Typically, after the motor is homed, a hold current is applied for long periods of time, such as several hours, to ensure that the motor does not lose position. After functional moves have been performed, the motor returns to this hold current. The energy to maintain this position is wasted as heat, although this measure is necessary to prevent inadvertent movement of the motor by vibration or other sources of movement.

Moreover, the stepper motor is generally homed when a positioning function starts, as the motor position may have changed while the motor was off. Consequently, every time the stepper motor loses power, it must be re-homed when it is started again. Depending on how far away the home position is, the stepper motor may take a long time, as much as several seconds, to reach that position and that operation may also be noisy.

It would be highly desirable to lock the stepper motor in place without a continuous power requirement for that functionality. This way, when the motor is started again, the stepper motor system would already be in the correct position and the need for a homing operation would be eliminated.

SUMMARY

One embodiment of the present disclosure provides a piezo-actuated brake system comprised of a brake acting on a disk fixed to an output shaft of a stepper motor. This piezo-actuated brake has a clamping structure, including two brake elements positioned in alignment on either side of the disk. The piezo-actuated brake includes a piezoelectric element connected to the clamping structure to move the brake elements together, thus applying a braking force to the disk.

An alternative embodiment is a piezo-actuated braking method for a stepper motor having a shaft. The braking system has a disk fixed on the shaft. Further, the braking system includes a piezo-actuated brake having a clamping structure, including two brake elements positioned in alignment on either side of the disk. The piezo-actuated brake includes a piezoelectric element connected to the clamping structure to move the brake elements together, thus applying a braking force to the disk. The method involves applying an electrical input to the piezoelectric element causing its movement. Subsequently, the mechanical movement of the piezoelectric element moves the clamping structure. Further, the method includes applying frictional force to a disk through action of the disk clamping structure.

DETAILED DESCRIPTION

The following detailed description is made with reference to the figures. Preferred embodiments are described to illustrate the disclosure, not to limit its scope, which is defined by the claims. Those of ordinary skill in the art will recognize a variety of equivalent variations on the description that follows.

As used herein, a "mechanical amplifier" is a mechanical device that accepts as input a force and applies a mechanical advantage to that input to produce an output exhibiting either greater pressure or greater amplitude of motion than the corresponding attribute of the input.

Overview

According to aspects of the disclosure illustrated here, methods and systems for braking a stepper motor are described. The braking system generally includes a disk fixed on a shaft, further including a piezo-activated braking system. The braking system also includes a clamping structure, with two brake elements positioned in alignment on either side of the disk. The piezo-actuated brake includes a piezoelectric element connected to the clamping structure to urge the brake elements together, thus applying a braking force to the disk. The described braking systems and methods require reduced power for braking and may also reduce the number of homing operations required by the stepper motor.

Exemplary Embodiments

Figure 1:
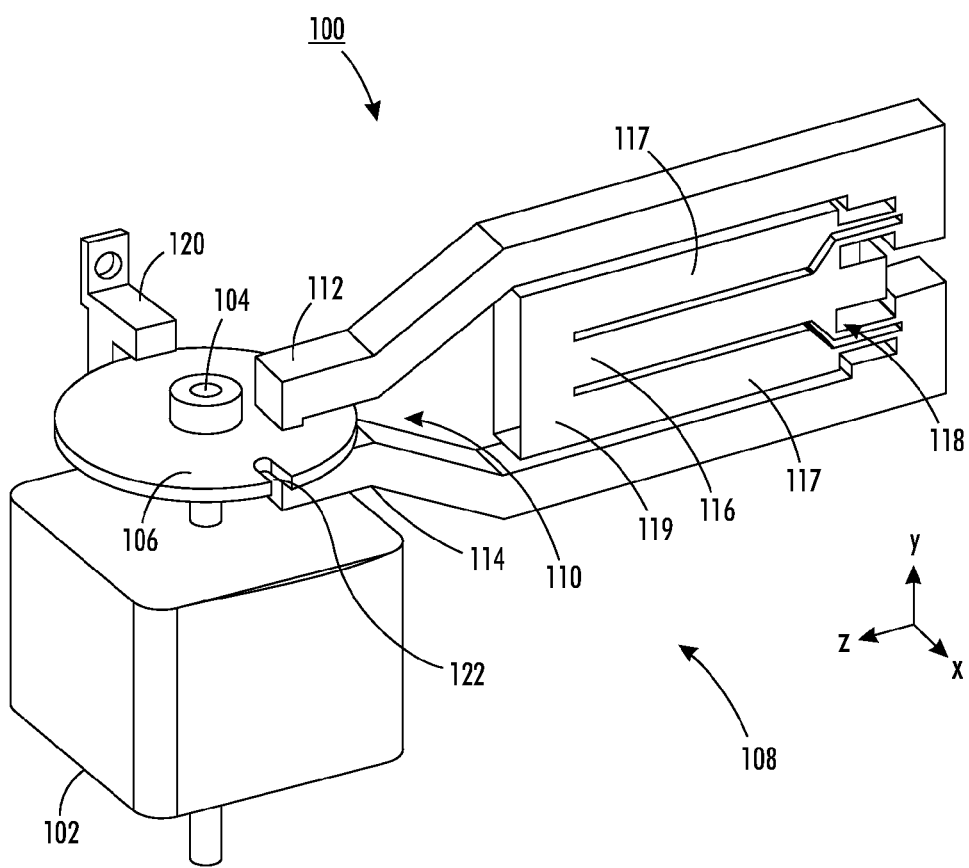
FIG. 1 illustrates an exemplary embodiment of a piezo-actuated braking system for a stepper motor.
Figure 2:
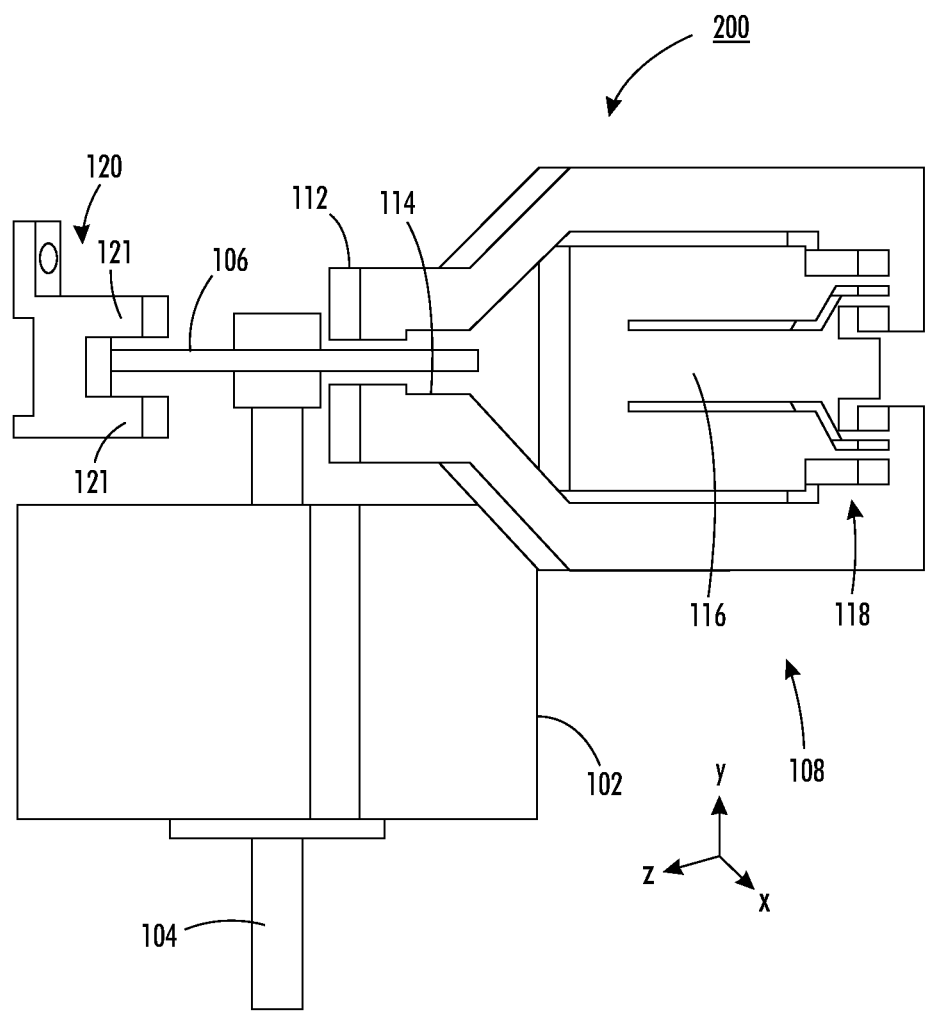
FIG. 2 illustrates an alternative view of the braking system of FIG. 1.

FIG. 1 illustrates an exemplary embodiment of a piezo-actuated braking system 100 for a stepper motor 102, and FIG. 2 illustrates an alternative view 200 of that system. The braking system 100 includes the stepper motor 102, which further includes a disk 106 carried on a shaft 104, external to the stepper motor 102 body. In alternative embodiments, the disk 106 may be positioned inside the stepper motor 102, as discussed in more detail in connection with FIG. 3. Further, the disk 106 may be a structure of a suitable shape, capable of rotating in concert with the stepper motor output shaft 104.

A piezo-actuated brake 108 is positioned adjacent to the disk 106 and is capable of clamping the disk 106 for stopping rotation or adding a damping force. The piezo-actuated brake 108 includes a clamping structure 110 connected to a mechanical amplifier 118, which is in turn connected to a piezoelectric element 116. On receiving electrical input, piezoelectric element 116 undergoes mechanical expansion, and that movement is translated and amplified by mechanical amplifier 118, which applies mechanical force to clamping structure 110. Consequently, the clamping structure 110 clamps down on the disk 106, impeding the motion of the motor.

The clamping structure 110 includes an upper brake element 112 and a lower brake element 114 positioned in alignment along the "Y" axis on either side of the disk 106, as shown in FIG. 2. The brake elements 112 and 114 are elongate legs disposed substantially in parallel with the "Z" axis up to a point, after which the legs converge radially inward over the disk 106 so that their ends form the clamping structure 110. The opposite ends of the brake elements 112 and 114 extend into the mechanical amplifier 118 formed between the two legs. The mechanical amplifier 118 may require the other ends of brake elements 112 and 114 to be further apart than the ends forming the clamping structure 110, so that a portion of brake elements 112 and 114 also extends toward the disk 106. In the illustrated embodiment, brake elements 112 and 114 are positioned very slightly above the surface of the disk 106. The amount of clearance depends on the size of the disk 106 and tolerances that can be maintained in manufacturing that disk 106, typically a fraction of 1 mm.

The mechanical amplifier 118 operates to amplify the generally small expansion of the piezoelectric element 116 into a movement sufficient to provide braking action to the clamping structure 110. A number of such devices are known and available to the art. An exemplary device is shown international patent application WO2011/041679A2, entitled "Apparatus and Method for Harvesting Electrical Energy from Mechanical Motion," hereby incorporated by reference. Other structures will be apparent to those in the art.

As employed in the embodiment of FIG. 1, mechanical amplifier 118 is an expandable device disposed between the brake elements 112 and 114, consisting generally elongate fingers 117 having spaces between them. Although only two elongate fingers 117 are shown here, any number may be present in other implementations. Each elongate finger 117 may be a member having a rectangular, substantially uniform cross section, attached to and extending from a fixed vertical arm 119, running parallel to the "Z" axis. In other implementations, the cross section of the elongate fingers 117 may be a circle, rhombus or any other suitable shape and the cross section size may vary according to requirement. As shown, the fixed vertical arm 119 runs parallel to "Y" axis, and the elongate fingers 117 extend perpendicularly to the fixed vertical arm 119, in a direction parallel or along the "Z" axis. Further, the elongate fingers 117 are spaced apart to facilitate the movement of the mechanical amplifier 118.

The mechanical amplifier 118 includes mechanical links 123 and a movable support member 121, which is movable in the "Z" direction. The other ends of the brake elements 112 and 114 are joined with the fixed vertical arm 119 and the movable support member 121 by the mechanical links 123, which are thin elongate rib-like structures, disposed substantially parallel to "Z" axis. The mechanical links 123 are compliant and adapted such that urging the movable support member 121 away from the fixed vertical arm 119 will cause the mechanical links 123 to flex, thereby causing the brake elements 112 and 114 to move towards one another.

The piezoelectric element 116 is embodied in the illustrated braking system 100 as an elongate member made up of numerous piezo crystals stacked together. The piezoelectric element 116 expands and contracts based on the electrical input supplied to it. In the present embodiment, the piezoelectric element 116 expands along the "Z" axis on receiving an appropriate electrical input and in turn leads to the movement of the movable support member 121, the flexing of the mechanical links 123, and the corresponding and amplified movement of the brake elements 112 and 114. Thus, the piezo-actuated brake 108 amplifies the mechanical motion created by the piezoelectric element 116 into greater mechanical motion at the ends of the brake elements 112 and 114.

The differential twisting of the mechanical amplifier 118, which in turn moves the brake elements 112 and 114 together, leads to the application of a braking force to the disk 106. Conversely, on receiving an appropriate electrical input, the piezoelectric element 116 contracts, separating the upper brake element 112 and lower brake element 114 (through the movement of the mechanical amplifier 118) to release the brake.

In other implementations, the direction of the movement of the piezoelectric element 116, mechanical amplifier 118, and subsequently, the brake elements 112 and 114 can vary. For example, the piezoelectric element 116 may expand and contract along the "Y" or "X" axis instead. Further, the mechanical amplifier 118 can be configured in such a manner that on the expansion of the piezoelectric element 116, the resultant movement of the mechanical amplifier 118 leads to the separation of the brake elements 112 and 114.

The mechanical amplifier 118 can be selected from among elements available to and known in the art. For example, Parker Hannifin manufactures a piezo-actuated mechanical amplifier which may be employed in some embodiments of the present disclosure. In the illustrated implementation, the mechanical amplifier 118 includes a multi-layer piezo element that can expand and contract on the application of appropriate electrical input.

Upon the expansion or contraction of the piezoelectric element 116, the configuration of the mechanical amplifier 118 amplifies the movement of the piezoelectric element 116. Thus, a small change in the size of the piezoelectric element 116 results in a more substantial movement of the brake elements 112 and 114.

The clamping structure 110 may carry braking material on the ends of the brake elements 112 and 114, ensuring maximum braking effect from the clamping action. Alternatively, the disk 106 may carry the braking material instead. The braking material may be chosen for improved wear and braking performance from any braking materials having high coefficient of friction, such as metal, plastic, rubber, leather, cloth, fiber composite, etc. Further, the braking material may be present in any appropriate form, for example, in the form of brake pads or material deposited on the surface of the brake elements 112 and 114 or the disk 106.

Further, a home sensor 120 (as seen in FIG. 2), positioned adjacent the disk 106, can detect the home position of the disk 106. In the present embodiment, the home sensor 120 is an optical sensor that is shaped such that two arms 125 wrap around the disk 106. Suitable optics are arranged to provide a beam across the arms 125 of the sensor and only detect changes within the area between the arms 125. Thus, the home position can be indicated by a notch 122 on the edge of the disk 106 when detected by the optical home sensor 120. Other embodiments may employ any suitable home sensor known in the art.

Figure 3:
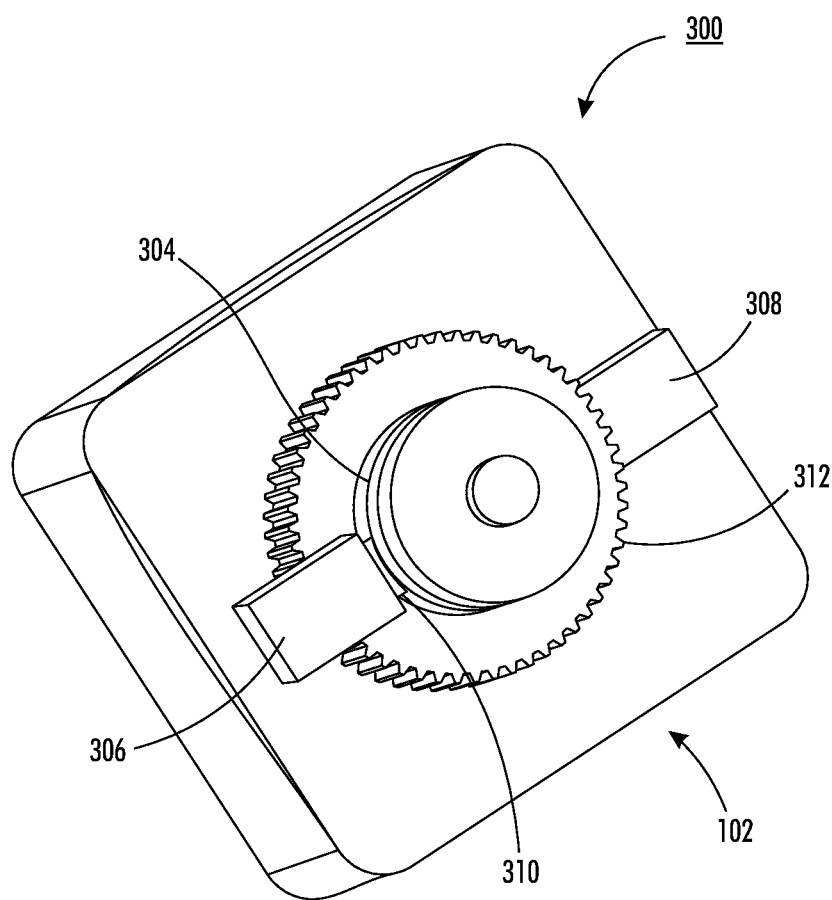
FIG. 3 illustrates another exemplary embodiment of a piezo-actuated braking system for a stepper motor. This embodiment differs by having the brake built internally within the stepper motor instead of applied externally.

FIG. 3 illustrates an exemplary embodiment of a piezo-actuated braking system 300 for the stepper motor 102. This embodiment differs by having the brake built internally within the stepper motor 102, instead of applied externally. Here, a disk 304 is positioned inside the stepper motor 102; the disk 304 is attached to the motor shaft similarly to the motor rotor 312. The disk 304 may be attached below a motor bearing.

In the illustrated embodiment, the disk 304 provides the braking surface, and the stator houses a first brake element 306 and a second brake element 308. These two brake elements 306 and 308, which are elongated legs, include piezo actuators disposed coaxially on either side of the disk 304 along its radial axis. When the two piezo actuators in the brake elements 306 and 308 are provided the proper electrical inputs, they move inward radially and make contact with the disk 304 and thus apply braking force to the stepper motor 102. In the present embodiment, the brake elements 306 and 308 carry braking material 310 to provide the correct wear and friction properties with the disk 304. Alternatively, the braking material may be placed on the disk 304 itself. With embodiments such as these, the motion of the piezo actuators is direct and does not require a mechanical amplifier to transfer motion.

It will be understood by those skilled in the art that in accordance with some embodiments of the disclosure, a piezo actuated brake could be applied to any internal or external component of or connected to the stepper motor 102, without departing from the scope or purpose of the claimed invention. For example, a piezo actuated brake could be designed to include a clamping structure that clamps down in an axial direction on the rotor 312 within the stepper motor 102. Many such alternatives and variations may be contemplated.

The piezo actuated brake of the braking system 100 remains applied without power. Thus after a device employing this braking system 100 is manufactured, only an initial homing function may be required. In implementations where one can reliably predict that the device will never undergo sufficient torque to overcome the brake, the stepper motor 102 would not need to be homed. Thus, the number of homing operations required during the use of the stepper motor 102 may be reduced significantly. In fact, a homing operation may be performed only at predetermined intervals, for example, once a day. Further, the timing of the homing operation can be based on an estimation of when the system employing the stepper motor 102 has time to perform the homing operation, instead of performing homing operations intermittently at inconvenient times which interrupt productive motor motion.

In addition to the present embodiment where the braking force is intended to hold the motor stationary, alternative embodiments would benefit from applying a partial braking force.

In addition to the embodiments of the present disclosure that allow homing operations to be performed less frequently, yet with greater flexibility, the braking system offers the possibility of several different applications. For instance, during initial start up, the stepper motor 102 can start in a jerky manner. Also, depending on the start speed, mechanical vibrations are generated which may take some time to be dampened. By applying the brake partially, the embodiments of the present disclosure help alleviate these issues.

Another application of such braking systems is in lightly damped systems, where rapid start and stop motion of the stepper motor 102 can leave system components ringing. The clamping structure 110 may be clamped intermittently to help settle vibrations. Then the brake may be released and the stepper motor 102 movement can be initiated again quickly.

Those skilled in the art would recognize alternative embodiments where adaptive controllers with input from motion sensors and encoders could vary a partial braking force for several benefits, such as low vibration, low noise, or increased stability. This partial force could also form the basis for a diagnostic function whereby the torque capability of an aged motor system could be assessed by differentially increasing this force and detecting when the motor no longer moves.

The embodiments of the present disclosure also facilitate the design of a brake which adds friction but does not stall the stepper motor 102 altogether. The stepper motor 102 can be tested by varying the level of braking force applied, to determine the threshold braking force at which the motor stalls. Based on this threshold, a lower braking force can be applied to simply increase friction, without completely braking or stalling the motor.

The terminology used herein is for the purpose of describing particular embodiments only and is not intended to be limiting of the disclosure. It will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A piezo-actuated braking system for a stepper motor, the system comprising:
   a disk attached to a shaft, the shaft being operatively connected to the output shaft of the stepper motor; and
   a piezo-actuated brake having:
      a clamping structure, including two brake elements positioned in alignment on either side of the disk; and
      a piezoelectric element mechanically connected to the clamping structure to move the brake elements together for applying a braking force to the disk.

2. The system of claim 1 further comprising a home sensor positioned adjacent the disk to detect when the disk is in a home position.

3. The system of claim 2, wherein the home sensor is an optical home sensor.

4. The system of claim 2, wherein the disk includes a notch to signify the home location.

5. The system of claim 1, wherein the disk and the clamping structure are located within the stepper motor.

6. The system of claim 5, wherein the disk is added below a motor bearing.

7. The system of claim 1, wherein the piezo-actuated brake further comprises a mechanical amplifier, mechanically coupled to the piezoelectric element, the mechanical amplifier being configured to amplify the motion resulting from the movement of the piezoelectric element.

8. The system of claim 1, wherein the disk carries braking material.

9. The system of claim 1, wherein the clamping structure carries braking material.

10. The system of claim 1, wherein the disk and the clamping structure are located external to the stepper motor.

11. The system of claim 1, wherein braking force insufficient to hold the motor stationary is used to control dynamic motion of the motor or for diagnostic purposes.

12. A piezo-actuated braking method for a stepper motor, the method comprising:
   providing a disk attached to a shaft, the shaft being operatively connected to the output shaft of the stepper motor;
   providing a piezo-actuated brake having:
      a clamping structure, including two brake elements positioned in alignment on either side of the disk; and
      a piezoelectric element mechanically connected to the clamping structure to urge the brake elements together for applying a braking force to the disk;
   applying an electrical input to the piezoelectric element causing its movement;
   moving the clamping structure through the mechanical movement of the piezoelectric element; and
   braking the rotation of the disk through the clamping action of the clamping structure on the disk.

13. The method of claim 12 further comprising a home sensor positioned adjacent the disk, detecting when the disk is in a home position.

14. The method of claim 13, wherein home sensor is an optical home sensor.

15. The method of claim 13, wherein the disk includes a notch to signify the home location.

16. The method of claim 12, wherein the disk and the clamping structure are located within the stepper motor.

17. The method of claim 16, wherein the disk is added below a stepper motor bearing.

18. The method of claim 12, wherein the piezo-actuated brake further comprises a mechanical amplifier, mechanically coupled to the piezoelectric element, the mechanical amplifier amplifying the movement of the piezoelectric element.

19. The method of claim 12, wherein the disk carries braking material.

20. The method of claim 12, wherein the clamping structure carries braking material.

21. The method of claim 12, wherein the disk and clamping structure are located external to the stepper motor.

22. The method of claim 12, wherein braking force insufficient to hold the motor stationary is applied to control dynamic motion of the motor or for diagnostic purposes.

23. A piezo-actuated braking system for a stepper motor, the system comprising:
   a disk attached to the output shaft of the stepper motor; and
   a piezo-actuated brake having:
      a clamping structure, including two brake elements positioned in alignment on either side of the disk; and
      a piezoelectric element mechanically connected to the clamping structure to urge the brake elements together for applying a braking force to the disk; and
      a mechanical amplifier, mechanically coupled to the piezoelectric element, the mechanical amplifier being configured to amplify the motion resulting from the movement of the piezoelectric element.

\* \* \* \* \*